United States Patent [19]
Whitaker

[11] Patent Number: 6,122,827
[45] Date of Patent: Sep. 26, 2000

[54] HYDRAULIC PIPE CUTTER

[76] Inventor: Frederick M. Whitaker, 17 Joyce Ave., Jefferson, La. 70121

[21] Appl. No.: 09/201,498

[22] Filed: Nov. 30, 1998

[51] Int. Cl.[7] .............................. B23D 21/06; B26D 3/16
[52] U.S. Cl. ................................. 30/96; 30/100
[58] Field of Search ................... 30/93, 94, 95, 30/96, 100, 101, 102

[56] References Cited

U.S. PATENT DOCUMENTS

| | | | |
|---|---|---|---|
| 2,862,295 | 12/1958 | Harding et al. | 225/103 |
| 2,949,669 | 8/1960 | Wheeler | 225/103 |
| 2,950,035 | 8/1960 | Wheeler | 225/1 |
| 3,129,865 | 4/1964 | Coblitz | 30/92 |
| 3,157,945 | 11/1964 | Picking | 30/100 |
| 3,283,978 | 11/1966 | Coblitz | 225/103 |
| 3,540,640 | 11/1970 | Coblitz | 225/103 |
| 3,763,559 | 10/1973 | Axbjer | 30/100 |

FOREIGN PATENT DOCUMENTS

| | | | |
|---|---|---|---|
| 1220052 | 1/1971 | United Kingdom | 30/100 |

*Primary Examiner*—M. Rachuba
*Assistant Examiner*—Dominic Troiano
*Attorney, Agent, or Firm*—Keaty Professional Law Corporation

[57] ABSTRACT

A chain pipe cutter has a pair of pivotal handles that carry a non-extendable cutter chain. A first handle has a contact member secured to a lower part of the first handle in a pivotal relationship so as to adapt the contact member to an angle most suitable for contacting a power actuator rod. The second handle has a holder for a power actuator rod and a retainer for retaining the rod in a fixed relationship to the handle when the power is delivered to the rod. An arm retainer allows to temporarily retain the handles in a spaced-apart relationship prior to application of the power. A conversion kit is provided for retrofitting a conventional manual pipe cutter to a power actuated cutter.

3 Claims, 3 Drawing Sheets

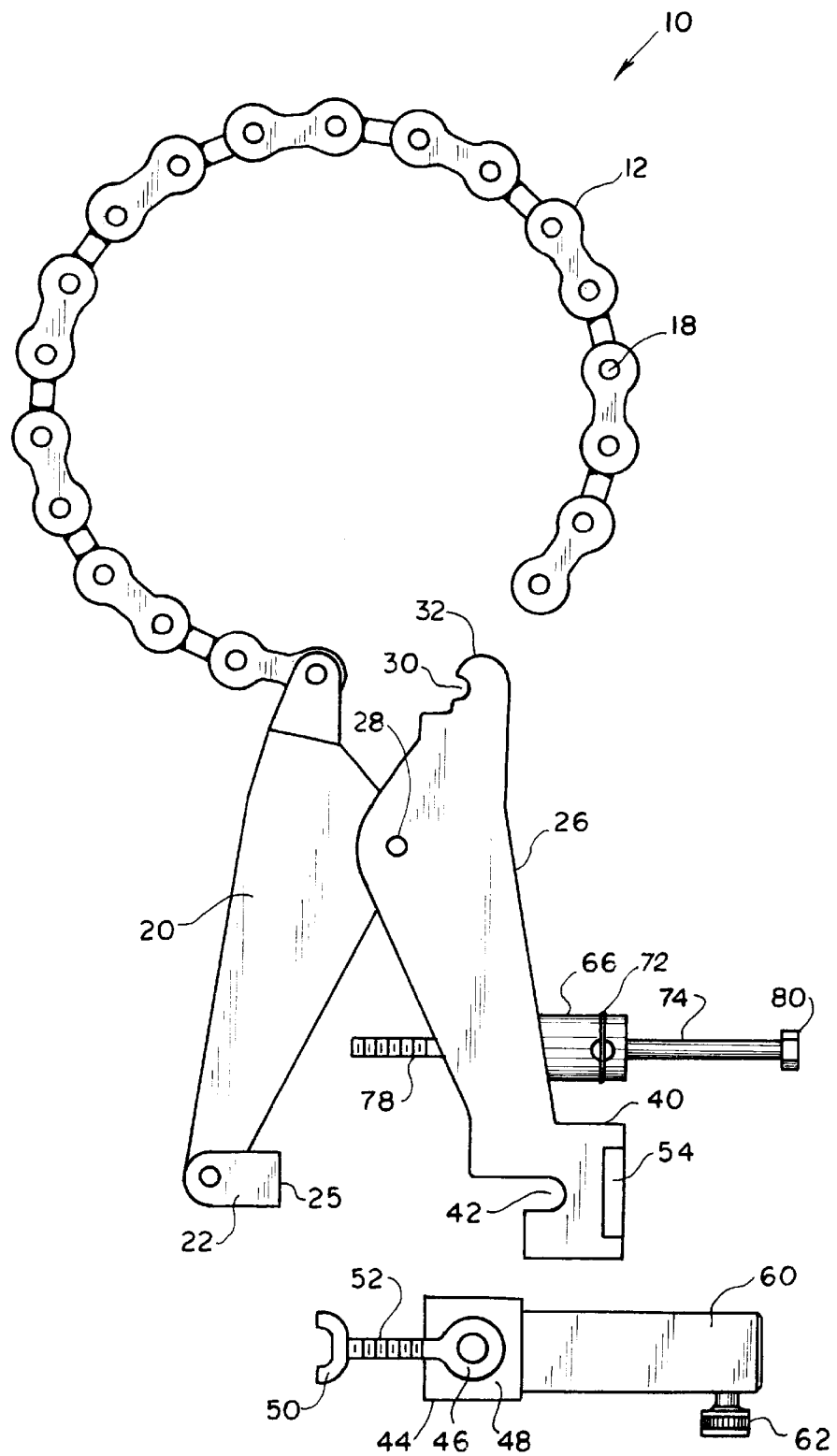
F I G . 3

HYDRAULIC PIPE CUTTER

BACKGROUND OF THE INVENTION

The invention relates to a cutter for fracturable pipes, such as cast iron pipes, clay pipes, terra cotta pipes and the like. Even more particularly the invention relates to a cutter utilizing a chain as the cutting member and a pair of handles that are assisted in squeezing action by a hydraulic power source.

Many industries utilize fracturable pipes made of cast iron, clay and other materials which cannot be evenly cut with conventional straight blade cutters. Various chain cutters have been developed for the specific purpose of cutting such materials. Some of the devices are operated by a hydraulic motor. For example, U.S. Pat. No. 2,862,295 issued on Dec. 2, 1958 to Harding et al. discloses a chain pipe cutter with two pipe cutting disks rotatably supported by a thrust member of a power step-up device. The thrust and tension forces are exerted in opposite directions along relatively cross lines for the power device. U.S. Pat. No. 2,949,669 issued on Aug. 23, 1960 to Wheeler discloses a cutter chain for cutting pipes and similar objects. The cutter has a pressure clamp with tubularly connecting jaws which engage the cutter chain. Movement of the jaws applies tension to the chain, which has been positioned around the pipe, and provides squeeze-cutting pressure. A hydraulic pump that operates the cutting device may be hand or foot operated.

U.S. Pat. No. 2,950,035 issued on Aug. 23, 1960 to Wheeler discloses a device for cutting cast iron pipes that makes a plurality of indentures around the outer peripheral surface of the pipe. The size of the indentures gradually increases from one side of the pipe to the opposite side of the pipe. A cutter chain is connected to a pair of jaws, which, in turn, are connected to a pair of clamp handles pivoted about one point. The force applied to the handles is multiplied by a compound leverage mechanism pivoted to the handles. U.S. Pat. No. 3,157,945 issued on Nov. 24, 1964 to Picking discloses a cutting device having a pair of spaced-apart cutting wheels mounted in parallel relationship to each other and a third cutting wheel which is connected to the base of the device for movement toward and away from the pair of cutting wheels.

U.S. Pat. No. 3,540,640 issued on Nov. 17, 1970 to Coblitz discloses the use of a cutting chain for applying a squeezing action to a pipe. The cutter has a lower stop limit roller and an upper stop limit roller. The rollers are designed to limit the extent, to which to cutting elements of the chain may cut into the wall of the pipe. U.S. Pat. No. 3,763,559 issued on Oct. 9, 1973 to Axbjer discloses a chain cutter of the roller type that has side links pivotally mounted on pins, on which the circular cutting elements are mounted. The distance between the side links of each chain link is adjustable. The tensioning jaws have co-acting guide surfaces that facilitate bringing of the ends of the chain into correct alignment with each other.

While these devices work satisfactory in many environments, there is still a need for a lightweight easily adjustable cutter for fracturable members that is easy to operate and inexpensive to manufacture. There is also a need for a conversion kit that would allow to retrofit a conventional manual pipe cutter to a power actuated cutter.

SUMMARY OF THE INVENTION

It is therefore an object of the present invention to provide an apparatus for cutting fracturable pipe members that can be easily operated by one person.

It is another object of the present invention to provide a pipe cutter of a chain type that is facilitated in the cutting action by a hydraulic power source.

It is a further object of the present invention to provide a conversion kit for pipe cutter that allows to easily retrofit existing long-handle manually operated cutting tools for use with a detachable hydraulic ram.

It is still a further object of the invention to provide an apparatus for cutting pipes that can be easily used in tight spaces and maneuvered by one person.

These and other objects of the present invention are achieved through a provision of an apparatus for cutting fracturable tubular members that comprises a pair of handles pivotally connected to each other. A first handle carries a contact member that is pivotally attached to a lower part of the first handle. The second handle carries a holder for power actuating means at a lower portion thereof.

A handle retainer is secured to the second handle a distance from said holder. The handle retainer has an elongated rod that extends between the handles to temporarily retain the handles in a spaced apart relationship before the power actuating means, such as a hydraulic power ram pushes the handles apart.

A non-extendable cutting chain is fixedly attached to the first handle and detachably secured to the second handle. As the hydraulic ram extends, it pushes against the contact member causing the handles to move apart, thereby applying a squeezing action on the cutting chain and the tubular member encircled by the chain. The tubular member is then cut along the line of the application of the cutting action.

BRIEF DESCRIPTION OF THE DRAWINGS

Reference will now be made to the drawings, wherein like parts are designated by like numerals, and wherein

FIG. 3 is a front view of the cutter of the present invention with the hydraulic ram disengaged.

DETAILED DESCRIPTION OF THE PREFERRED EMBODIMENT

Figures 1, 2:
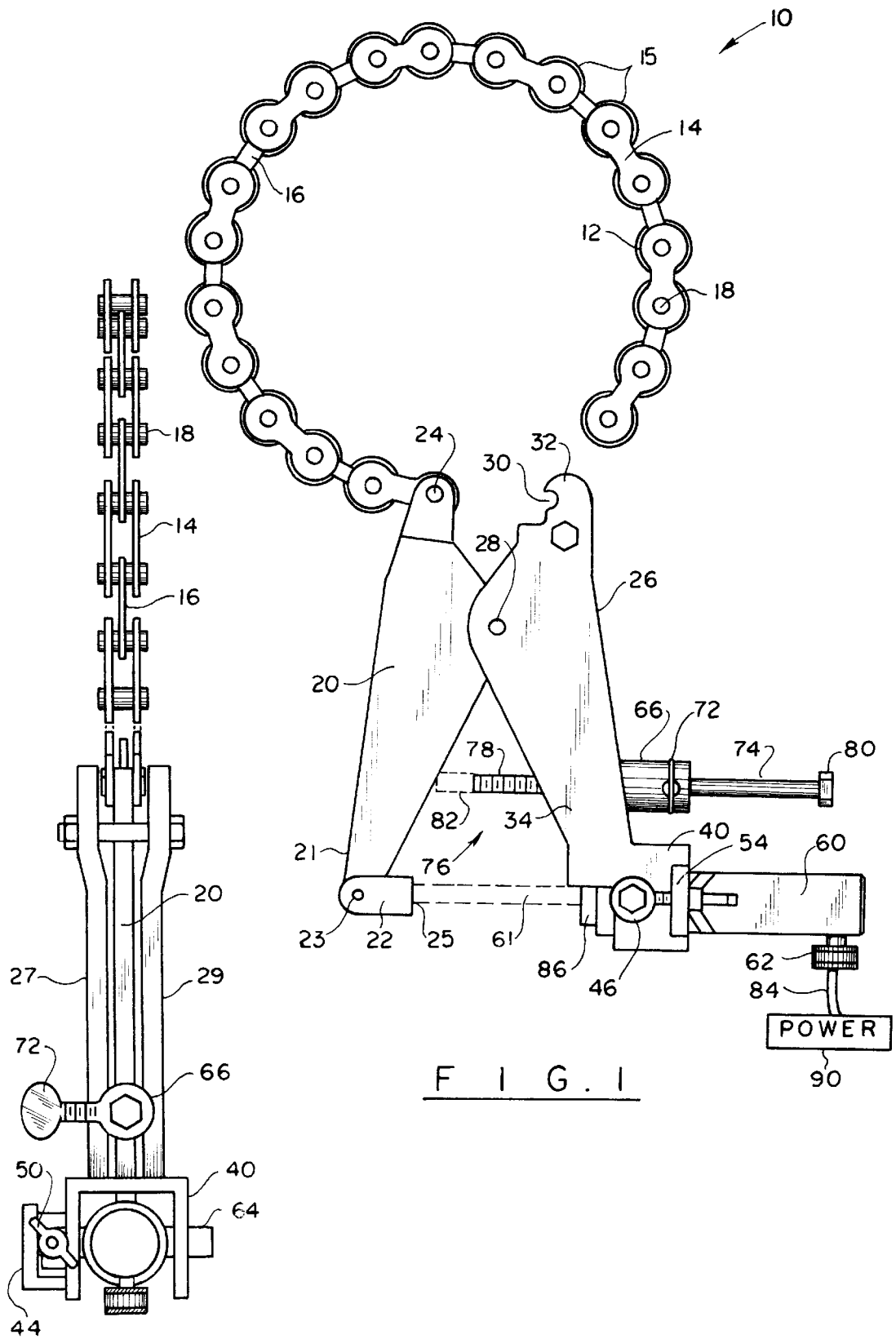
FIG. 1 is a front view of the pipe cutting apparatus in accordance with the present invention, with the hydraulic ram engaged.
FIG. 2 is a side view of the apparatus of the present invention.
Figure 12:
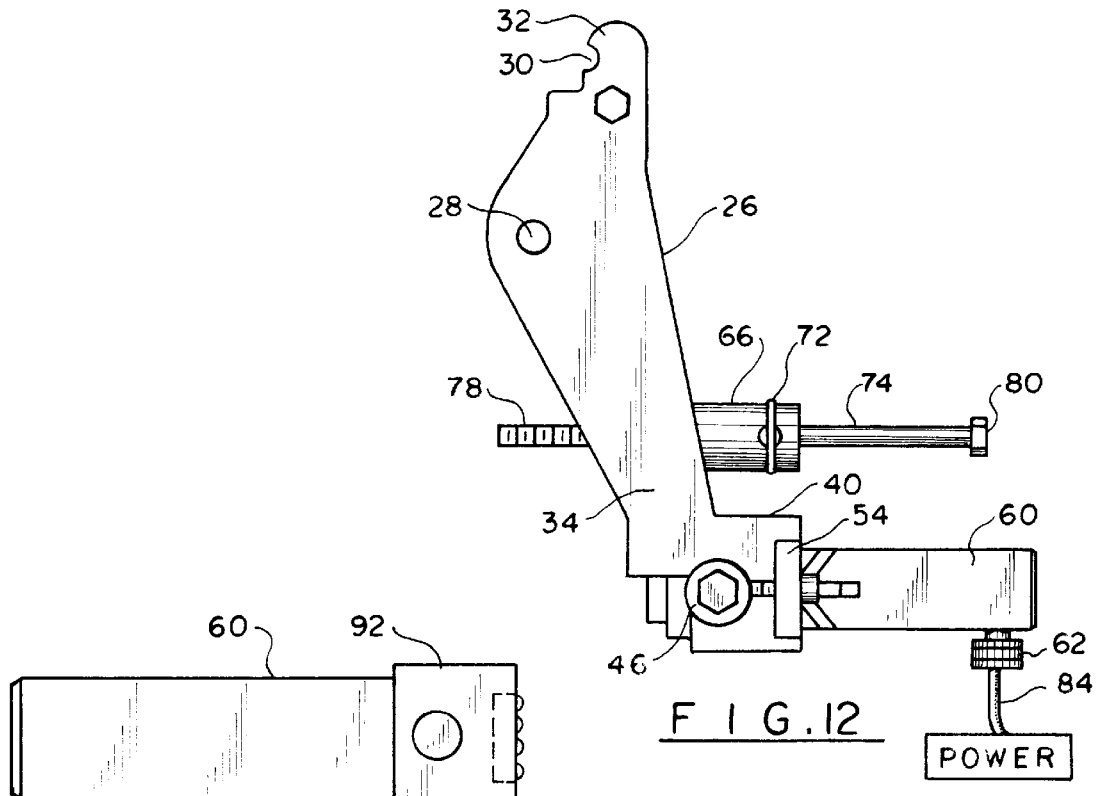
FIG. 12 is a front view of the parts forming a conversion kit for pipe cutters in accordance with the present invention.
Figure 4:
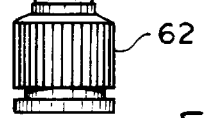
FIG. 4 is a detail side view of a ram member detachably connectable to the pipe cutting apparatus.
Figure 8:
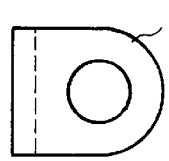
FIG. 8 is a front view of a contact member that is securable on a pipe cutter handle of the apparatus of the present invention.
Figure 5:
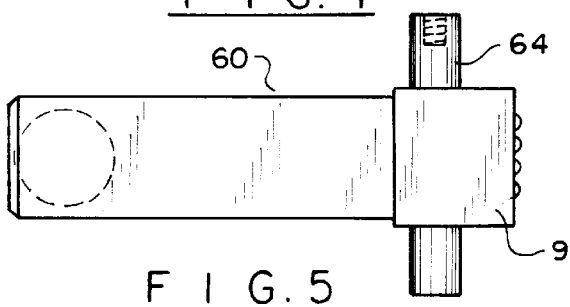
FIG. 5 is a detail top view of the ram retainer member shown in FIG. 4.
Figure 9:
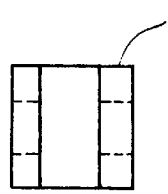
FIG. 9 is a detail view of the contact member shown in FIG. 8.
Figure 6:
FIG. 6 is a detail front view of a ram retainer of the present invention.
Figure 10:
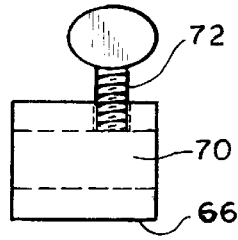
FIG. 10 is a detail view of an arm retainer for use with the apparatus of the present invention.
Figure 7:
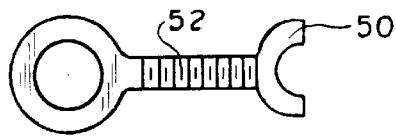
FIG. 7 is a detail side view of the ram retainer shown in FIG. 6, with a wing nut.
Figure 11:
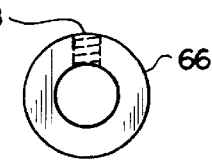
FIG. 11 is a detail view of the arm retainer shown in FIG. 10.

Turning now to the drawings in more detail, the hydraulic pipe cutter of the present invention is designated by numeral 10. The cutter comprises a cutter chain 12 adapted for encircling a hollow tubular member object, such as a pipe. The chain 12 is adapted to be tightened around the pipe and to cut the pipe about the circumference thereof with an even cut. The chain 12 is comprised of a plurality of links made of external chain link elements 14 and internal chain links 16. The links 14 and 16 are joined together by transverse pins 18 which extend through corresponding aligned openings made in the links 14 and 16. Actual cutting elements 15 are conventional cutters, schematically shown in FIG. 1.

One end of the chain 12 is pivotally connected to a first handle, or arm 20 which is a single-member arm having an upper portion pivotally connected to the chain 12 by a transverse pivot pin 24. The lower portion 21 of the arm 20 is connected to a contact member 22. The contact member 22 swivels, or pivots about a connecting pin 23 that attaches the contact member 22 to the lower portion 21 of the arm 20.

A second handle, or a second clamp arm 26 is a two-member arm, that is an arm comprised of two similar members 27, 29 spaced apart from each other, as shown in FIG. 2. The arm members 27, 29 are attached to the first arm 20 by a securing pin 28. Both arms 20 and 26 pivot about the pin 28. The arm members 27, 29 are each provided with a hook-shaped recess 30 adapted for engaging the pins 18 of the chain 12 at any point along the chain. In this manner, the length of the chain 12 can be adapted to the exterior circumference of the elongated member to be cut and tightened around that member.

When the cutter chain 12 is engaged with a hook-shaped end 32 of the handle, or arm 26, the arms 20 and 26 can be pivoted in relation to each other to exert a cutting force on that elongated member. During operation, the cutter chain does not expand or contract but rather applies a radially-directed force uniformly about the circumference of the object to be cut with the assistance of a power actuating means, for example hydraulic pressure, as will be explained in more detail hereinafter.

Secured to a lower end 34 of the arm 26 is a ram holder 40 provided with an arcuate cutout 42 (FIG. 3) in the central portion thereof. The cutout is formed in the side of the ram holder 40 that faces the single arm member 20 and the contact member 22. A ram retainer 44 has a knob 46 extending outwardly from a ram retainer plate 48. When a ram retainer 44 is secured with the ram holder 40 a stem of the knob 46 extends into the cutout 42, as shown in FIG. 1, and a wing nut 50 extends between the ram holder 40 and the ram retainer 46, as shown in FIGS. 1 and 2. The wing nut 50 is provided with an externally threaded stem 52 that allows the wing nut 50 to be tightened and moved into a contact with a ram retainer portion 54 for securing a hydraulic ram 60.

The ram 60 is provided with a connector 62 in fluid communication with an interior of the ram 60. The connector 62 is adapted for connecting to a hydraulic pump, for example a hand pump, or a foot pump for engaging an internal connector member 62 by a hose (not shown). An opposite end 92 of the ram 60 carries an internally threaded holder 64 which is adapted to receive a bolt connected to the knob 46 and retain the ram retainer 44 in place.

A ram rod 61, shown in phantom lines in FIG. 1, telescopically extends from the ram body 60 in contact with the contact member 22 when the power is supplied to the power actuating means 90.

An arm retainer 66 is secured between the arm members 27 and 29 to temporarily retain the handles 20 and 26 in a spaced-apart relationship with each other prior to application to the hydraulic force. The arm retainer 66 is comprised of a cylindrical body having internal threads 68 extending through a thickness thereof to a through opening 70. The internal threads 68 are adapted to receive a thumb screw 72 for holding a spacing rod 74 in place. The spacing rod 74 extends through the opening 70, between the arm members 27 and 29 into a space 76 formed between the arms 20 and 26. A proximate end 78 of the spacer rod 74 can be provided with threads, as shown in FIG. 1, if desired. The distant end of the rod 74 carries a shoulder bolt 80.

In operation, the user positions the chain 12 around the object to be cut, for example a fracturable pipe or other tubular object. The chain is adjusted in length, so as to tightly encircle the exterior circumference of the object within the loop formed by the chain.

Pins 18 that extend through the chain links 14 and 16 are engaged in the recess 30 by the hook-shaped portion 32. The remainder of the chain link may simply dangle from the pipe cutter when the length of the chain exceeds the outside diameter of the tubular object.

An arm retainer is secured between the arm members 27 and 29 and the rod 74 is pushed between the arm members 27, 29 to extend to the single arm 20, to a position shown in phantom lines 82. The rod 74 pushes the arm 20 away from the arm 26 to the farthest position possible. A ram retainer 44 is positioned in the ram holder 40, such as shown in FIGS. 1 and 2, with a knob 46 extending in the recess 42. A hydraulic ram 60 is then positioned within the ram holder 40 and secured in place by the ram retainer 44.

A hose 84, schematically shown in FIG. 1, is then connected to the connector 62 and to a hydraulic power source 90 to supply the ram 60 with hydraulic power. A ram rod 86 that is telescopically engaged within the ram body 60 extends from the ram 60 to a position shown in phantom lines 61 and moves into a contact with a contact surface 25 of the contact member 22.

The arms 20 and 26 are then pushed apart at the lower ends thereof. As a result, a tightening action is transferred to the chain 12 that cuts into the tubular object and fractures it along the cutting line. The contact member 22, being pivotally connected to the arm 20 easily adjusts its angular position to make a better contact with the ram rod 86.

The hydraulic pipe cutter of the present invention can be used for cutting various diameter pipes. The pipes may be cast iron, clay, or terra cotta, or any other fracturable material. Typical diameters encountered are 2" to 6" service weight cast iron pipe, 4" extra heavy cast iron, and 6" to 12" terra cotta or cement pipe.

The apparatus of the present invention is easily maneuverable, tight quarters, by a single user. The total weight of the apparatus is approximately 24 pounds with only half of that needing to be maneuvered at any given time.

The apparatus of the present invention can also be used for retrofitting existing long-handled manual pipes, such as cast iron pipe cutters. The conversion kit includes the handle 26 with the holder 40 and the ram retainer 44, handle retainer 66, and contact member 22. To retrofit a manual cutter, the handles of the cutter are shortened, and the bolts, which connect the jaws, or handles with the rest of the cutter are removed. One of the arms, or handles of the pipe cutter is removed and replaced with the 2-member handle 26 of the apparatus of the present invention. The handle 26 has the ram holder adapted 40 for receiving the ram retainer 44 and the ram 60.

The arms, or handles of the cutter are then connected with a pivot pin 28, allowing the arms 20 and 26 to be pivotally connected to each other. A contact member 22 is then secured on the arm 20, with one of the bolts removed when disengaging the handle sections of the regular pipe cutter. The arm retainer 66 is provided with a spacer rod 74 and a thumb screw 72. Of course, a suitable manual will be provided in the conversion kit for installation of the kit and connection to the hydraulic power source.

Many changes and modifications can be made in the present invention without departing from the spirit thereof. I, therefore, pray that my rights to the present invention be limited only by the scope of the appended claims.

I claim:

1. An apparatus for cutting fracturable tubular members, comprising:

a flexible cutter chain adapted for encircling and cutting said tubular members;

a first handle pivotally attached at a first end thereof to one end of said cutter chain by a transverse pivot pin, a second end of said first handle having pivotally connected thereto a contact member;

a second handle having a first part for detachably securing a second end of said cutter chain, said second handle comprising a means for retaining a power actuating means, said retaining means comprising a hydraulic ram holder and a ram retainer secured to said ram holder and to a second end of said second handle, said ram retainer having secured thereto a ram retainer plate, an outwardly extending knob that extends into an arcuate cutout formed in said hydraulic ram holder and an elongated threaded rod for detachably securing a hydraulic ram in said hydraulic ram holder, said hydraulic ram having an internally threaded holder for receiving a bolt connected to said outwardly extending knob and securing said ram retainer to said hydraulic ram;

a contact member pivotally mounted on said first handle, said contact member being adapted for receiving application of an external force tending to push said first handle from said second handle, thereby imparting a squeezing action on said cutter chain;

a handle retainer means mounted on said second handle for temporarily retaining said handles in a spaced-apart relationship prior to application of hydraulic force to said power actuating means, said handle retainer means comprising a cylindrical body having a through opening for receiving and retaining a spacing rod therein, said spacing rod pushing said first handle away from said second handle prior to securing said hydraulic ram in said hydraulic ram holder.

2. A conversion kit for retrofitting a manual pipe cutter having at least one handle, said kit comprising:

a two-member handle adapted for pivotal connection to said at least one handle;

a holder for power actuating means mounted on a lower part of said two-member handle, said holder comprising a hydraulic ram holder and a ram retainer secured to said ram holder and carried by a lower part of said two-member handle, said ram retainer carrying a ram retainer plate, an outwardly extending knob that extends into an arcuate cutout formed in said hydraulic ram holder and an elongated threaded rod for detachably securing a hydraulic ram in said hydraulic ram holder, said hydraulic ram carrying an internally threaded holder for receiving a bolt connected to said outwardly extending knob and securing said ram retainer to said hydraulic ram;

a means for temporarily retaining said at least one handle and said two-member handle in a spaced-apart relationship prior to application of an external power source to said at least one handle and said two-member handle, said retainer means comprising a cylindrical body having a through opening for receiving and retaining a spacing rod therein, said spacing rod pushing said at least one handle away from said two-member handle prior to securing said hydraulic ram in said hydraulic ram holder; and a contact member adapted for attachment to said at least one handle opposite said holder.

3. The conversion kit of claim 2, wherein said contact member is pivotally attachable to said at least one handle.

* * * * *